(12) United States Patent
Kohli et al.

(10) Patent No.: US 10,515,355 B2
(45) Date of Patent: Dec. 24, 2019

(54) SYSTEMS AND METHODS FOR COLLECTING DEVICE DATA FROM DIGITAL WALLET AUTHENTICATIONS

(71) Applicant: MasterCard International Incorporated, Purchase, NY (US)

(72) Inventors: Manoneet Kohli, O'Fallon, MO (US); Laurie Ann Nicoletti, White Plains, NY (US)

(73) Assignee: Mastercard International Incorporated, Purchase, NY (US)

( * ) Notice: Subject to any disclaimer, the term of this patent is extended or adjusted under 35 U.S.C. 154(b) by 240 days.

(21) Appl. No.: 15/410,466

(22) Filed: Jan. 19, 2017

(65) Prior Publication Data
US 2018/0204209 A1    Jul. 19, 2018

(51) Int. Cl.
*G06Q 20/36*      (2012.01)
*G06Q 20/40*      (2012.01)
(Continued)

(52) U.S. Cl.
CPC .......... *G06Q 20/36* (2013.01); *G06Q 20/363* (2013.01); *G06Q 20/40145* (2013.01);
(Continued)

(58) Field of Classification Search
CPC ...................................................... G06Q 20/10
See application file for complete search history.

(56) References Cited

U.S. PATENT DOCUMENTS

| 6,944,669 | B1 | 9/2005 | Saccocio |
| 8,682,798 | B2 | 3/2014 | Patterson |

(Continued)

FOREIGN PATENT DOCUMENTS

| EP | 0917120 A2 | 5/1999 |
| WO | 2014186871 A1 | 11/2014 |

OTHER PUBLICATIONS

Qiuxiang Dong; Zhi Guan; Zhong Chen. Trustworthy Collaborative Filtering through Downweighting Noise and Redundancy Web Technologies and Applications. 17th Asia-Pacific Web Conference, APWeb 2015. 129-40; Springer International Publishing. (2015) (Year: 2015).*

(Continued)

*Primary Examiner* — Kito R Robinson
*Assistant Examiner* — Abdulmajeed Aziz
(74) *Attorney, Agent, or Firm* — Armstrong Teasdale LLP

(57) ABSTRACT

A computer-based method for collecting digital wallet data from a digital wallet transaction initiated by a user is provided. The method includes receiving registration data for a user in response to the user registering into a digital wallet application, wherein the registration data includes demographic data and device registration data including a device identifier used for identifying the user device when in communication with another computing device. The method also includes storing the registration data within at least one memory device and receiving digital wallet data as part of a digital wallet transaction initiated by the user using the digital wallet application on the user device, wherein the digital wallet data includes transaction data, device communication data, and biometric data. The method further includes comparing the digital wallet data to the registration data and linking the digital wallet data within the at least one memory device to the registration data.

11 Claims, 8 Drawing Sheets

(51) Int. Cl.
*G06Q 30/02* (2012.01)
*G06Q 30/06* (2012.01)
*G06F 21/32* (2013.01)

(52) U.S. Cl.
CPC ......... *G06Q 30/0201* (2013.01); *G06F 21/32* (2013.01); *G06Q 30/0205* (2013.01); *G06Q 30/0255* (2013.01); *G06Q 30/0631* (2013.01)

(56) References Cited

U.S. PATENT DOCUMENTS

| | | | |
|---|---|---|---|
| 9,767,471 B1* | 9/2017 | Perrone | G06Q 30/0631 |
| 2007/0198435 A1* | 8/2007 | Siegal | G06F 21/32 |
| | | | 705/67 |
| 2011/0178847 A1 | 7/2011 | Rane et al. | |
| 2012/0296724 A1* | 11/2012 | Faro | G06Q 30/00 |
| | | | 705/14.27 |
| 2014/0012740 A1 | 1/2014 | Carson et al. | |
| 2014/0032259 A1* | 1/2014 | LaFever | G06Q 30/0201 |
| | | | 705/7.29 |
| 2014/0129448 A1 | 5/2014 | Aiglstorfer | |
| 2014/0244742 A1* | 8/2014 | Yu | H04W 4/21 |
| | | | 709/204 |
| 2014/0279185 A1 | 9/2014 | Merz et al. | |
| 2014/0372338 A1* | 12/2014 | Kim | G06Q 30/0282 |
| | | | 705/347 |
| 2015/0220951 A1 | 8/2015 | Kurapati et al. | |
| 2016/0092891 A1 | 3/2016 | Flett | |
| 2016/0148257 A1* | 5/2016 | Chavarria | G06Q 30/0255 |
| | | | 705/14.53 |
| 2016/0189312 A1 | 6/2016 | Lee et al. | |
| 2017/0148081 A1* | 5/2017 | Chauhan | G06Q 30/0631 |
| 2017/0169497 A1* | 6/2017 | Lee | G06Q 30/0631 |

OTHER PUBLICATIONS

PCT International Search Report and Written Opinion, Application No. PCT/US2017/064166, dated Jan. 31, 2018, 13 pps.

* cited by examiner

SYSTEMS AND METHODS FOR COLLECTING DEVICE DATA FROM DIGITAL WALLET AUTHENTICATIONS

BACKGROUND

This disclosure relates generally to collecting device data from computing devices used in digital wallet transactions, and more particularly, to systems and methods for determining user demographics by using device communication data and biometric data collected from a user computing device having access to a digital wallet application.

Consumers are often times able to use a variety of methods to perform payment transactions to purchase goods and services. These methods include use of cash, plastic payment cards, smartphones, and other computing devices operated by users (also known as user computing devices) that are able to provide account data and transaction data to complete a purchase. In the case of account data being communicated for the transactions, a payment processor computing device processes the payment transactions over a processing network. The payment cards and/or user computing devices may be used at point of sale (POS) devices operated by merchants (in what are referred to herein as merchant location transactions), or users may initiate transactions when not at a merchant physical location (e.g., an online transaction initiated from home, such as to order goods from a merchant website). These latter transactions are sometimes also referred to as card-not-present transactions (CNP), because a payment card is not physically presented at a merchant location. In some case, merchant location transactions and CNP transactions may be performed using a digital wallet that is either stored on a user's smartphone as an application or on another user computing device as an account-on-file.

A digital wallet is typically an application the user accesses from a computing device. The computing device may be a device associated with the user, for example, a smartphone, a tablet, or a wearable computing device. The computer device may also be a laptop, a desktop, or other electronic device. The digital wallet application allows the user to use the computing device to purchase items without using a physical card. For example, the user may want to purchase a coffee. Rather than retrieving a physical card from a physical wallet, users may activate their digital wallet application on the user computing device and use card data saved in association with the digital wallet to purchase the coffee. In another example, users may want to purchase something from a website, such as concert tickets. Instead of entering the account number on the website to complete the transaction, users may access their digital wallet application on the computing device and use card data saved in association with the digital wallet to purchase the tickets. Typically, the digital wallet requires a biometric authentication from the user to complete the purchase. Biometric authentication is a process that uses biometric data that validates the identity of a user by measuring an intrinsic characteristic of the user. Biometric data may include passwords, fingerprint recognition, facial recognition, voice recognition, and/or any other biometric data use for identity verification. In one instance, the biometric authentication process may take place at the user computing device. In another instance, the biometric authentication process may take place at another computing device.

When a digital wallet transaction is performed, certain device communication data (also known as metadata) is generated by the user device. In some cases, this metadata may be accessible to the merchant computing device (e.g., website) or the POS device during the purchase. A system is needed that is capable of capturing this metadata along with the biometric data, and combining it with the transaction data. By doing so, certain outputs can be generated for a variety of users. It would be beneficial to have a system that is able to capture this data and generate such output.

BRIEF DESCRIPTION

In one aspect, a computer-based method for collecting digital wallet data from a digital wallet transaction initiated by a user for determining the user's demographics is provided. The method is implemented using a data collector (DC) computing device including at least one processor in communication with at least one memory device. The method includes receiving registration data for a user in response to the user registering into a digital wallet application, wherein the registration data includes demographic data of the user and device registration data including a device identifier used for identifying the user device when in communication with another computing device. The method also includes storing the registration data within the at least one memory device and receiving digital wallet data as part of a digital wallet transaction initiated by the user using the digital wallet application on the user device, wherein the digital wallet data includes transaction data, device communication data, and biometric data. The method further includes comparing the digital wallet data to the registration data, linking the digital wallet data within the at least one memory device to the registration data including the demographic data of the user, and determining the demographic data associated with a plurality of users for at least one merchant.

In another aspect, a data collector (DC) computing device including at least one processor in communication with at least one memory device is provided. The DC computing device is configured to receive registration data for a user in response to the user registering into a digital wallet application, wherein the registration data includes demographic data of the user and device registration data including a device identifier used for identifying the user device when in communication with another computing device. The DC computing device is also configured to store the registration data within the at least one memory device and receive digital wallet data as part of a digital wallet transaction initiated by the user using the digital wallet application on the user device, wherein the digital wallet data includes transaction data, device communication data, and biometric data. The DC computing device is further configured to compare the digital wallet data to the registration data, link the digital wallet data within the memory to the registration data including the demographic data of the user, and determine the demographic data associated with a plurality of users for at least one merchant.

In a further aspect, a non-transitory computer readable medium that includes executable instructions for collecting digital wallet data from a digital wallet transaction initiated by a user for determining the user's demographics is provided. When executed by a data collector (DC) computing device including at least one processor in communication with at least one memory device, the computer executable instructions cause the DC computing device to receive registration data for a user in response to the user registering into a digital wallet application, wherein the registration data includes demographic data of the user and device registration data including a device identifier used for identifying the user device when in communication with another computing device. The computer executable instructions also cause the DC computing device to store the registration data within the at least one memory device and receive digital wallet data as part of a digital wallet transaction initiated by the user using the digital wallet application on the user device, wherein the digital wallet data includes transaction data, device communication data, and biometric data. The computer executable instructions further cause the DC computing device to compare the digital wallet data to the registration data, link the digital wallet data within the memory to the registration data including the demographic data of the user, and determine the demographic data associated with a plurality of users for at least one merchant.

BRIEF DESCRIPTION OF THE DRAWINGS

FIGS. 1-7 show example embodiments of the methods and systems described herein.

FIG. 1 is a schematic diagram illustrating an example data collector (DC) platform for collecting device communication data, transaction data, and biometric data from digital wallet payment transactions, and determining a user's demographics based upon the device communication, transaction, and biometric data.

FIG. 2 is a block diagram of the DC platform shown in FIG. 1 including multiple example computing devices communicatively coupled to each other via a plurality of network connections.

FIG. 3 illustrates an example configuration of a server system that includes or is in communication with the DC computing device shown in FIG. 2.

FIG. 4 illustrates an example configuration of a user system, such as user computer device configured to transmit user demographic data and payment card transaction location data.

FIG. 5 shows an example configuration of a server system, such as the DC computing device shown in FIG. 2.

FIG. 7 shows an example configuration of a database within a DC computing device that collects device communication, transaction, and biometric data.

Like numbers in the figures indicate the same or functionally similar components.

DETAILED DESCRIPTION

Figure 1:
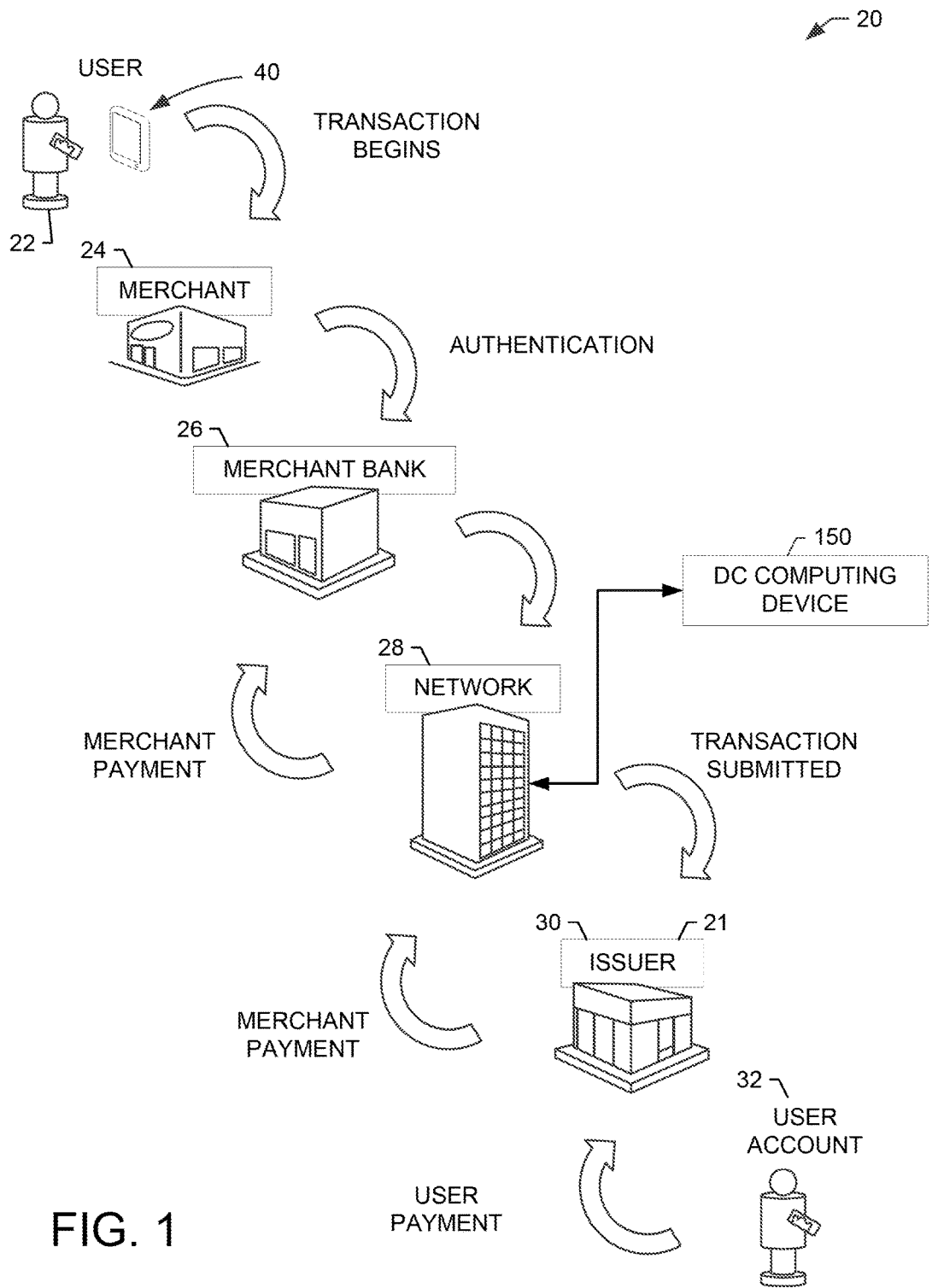

The present disclosure relates to a data collector (DC) computing platform that is configured to collect device communication data and biometric data from a user computing device used to initiate a payment transaction with a merchant using a digital wallet application, wherein the collected device communication data and the biometric data may be used to determine the user's demographics. The DC computing platform, similarly, is able to determine the demographics for all such users (e.g., digital wallet users) who visited the merchant. The DC computing platform may also determine the demographics for all users who visited a variety of such merchants. In at least some implementations, the DC computing platform includes a DC computing device that is in communication with a payment processor computing device. In other embodiments, the DC computing device is integrated into or part of the payment processor computing device. The DC computing platform is configured to collect digital wallet registration data and digital wallet data. The digital wallet registration data is collected when a user accesses the digital wallet application for the first time. In certain embodiments, the user may access the digital wallet application after downloading the application to a user computing device, such as a smartphone, a tablet, or a wearable computing device. In other embodiments, the user may access the digital wallet application using an internet browser (e.g., Internet Explorer) in a user computing device. The digital wallet registration data includes demographic data of the user and device registration data identifying the user computing device used for registration. The digital wallet data includes device communication data or metadata from the device used by the user to make a purchase, transaction data for the payment transaction initiated by a user using a digital wallet application, and biometric data for the user when the user self-authenticates to the user device when making the purchase.

At the time of registration or enrollment for the digital wallet application, the user computing device creates device registration data. During the registration process, the DC computing device receives and stores the device registration data, which may include user account data, device data associated with the user computing device, and demographic data of the user. For example, during the registration process, users may be asked for demographic data, such as their age and preferred language. Preferred language can aid in the determination of a country of origin of the user because many countries have a national language. This demographic data may be stored in the memory as part of the registration data. The device registration data may include some of this demographic and/or other device data that may be shared when the digital wallet is used to perform a transaction. For example, device registration data may include device ID, browser type, IP address, user location data, biometric data, preferred language, etc. In some instances, the device registration data may be gathered automatically from the user computing device or from an issuing bank associated with the user's account.

Subsequently, each time the user computing device authorizes a transaction at a point of sale (POS) device associated with a merchant, the POS device transmits digital wallet data to the payment processor and to the issuing bank via the payment network. The digital wallet data may include transaction data, the device communication data or metadata, and biometric data. The transaction data includes data associated with the transaction along with a transaction ID. The transaction data may include, for example, biometric authorization verification, transaction amount, merchant ID, geographical location, item data for describing the good or service being purchased, and other data associated with the transaction. The metadata may include or relate to demographic data of the user. Demographic data may be collected when the digital wallet application is validated. In some instances, the digital wallet data does not include any of the metadata. In those instances, the metadata may be provided through a separate data channel and linked to the digital wallet data through a transaction ID or some other identifier so that the metadata can be stored with the transaction data for the transaction. The biometric data may be part of or associated with the device communication data and/or transaction data. Biometric data ensures that it is the user making the purchase. Biometric authentication verification is the confirmation that the biometric authentication was successful. The DC computing device obtains the transaction data, metadata, and biometric data through the user's digital wallet application.

The digital wallet data is received at the payment processor where it is processed for payment. Any metadata that is provided with or in combination with the digital wallet data is stored in the payment processor database. This data is then used to determine the demographic data (country of origin, age group, etc.) of the user. For example, the demographic data may be included in the metadata or may be determined by performing a lookup using at least part of the metadata. The lookup may be performed either at the payment processor database or at the issuing bank database where the demographic data of the user is stored as part of the digital wallet registration process.

The user computing device verifies the user via biometric authentication as part of each digital wallet transaction. Therefore, there is verification that the user made a purchase at a merchant (e.g., the geographic location or website). Digital wallet transactions are transactions that occur through the digital wallet application coupled to the computing device. Physical cards are often stolen or used remotely. User verification prevents stolen cards or remote purchases from skewing the data. When the digital wallet application is used, the biometric authentication ensures it is the user making the purchase.

In certain embodiments, the DC computing device receives digital wallet data from a POS device. In one example, a user computing device may initiate a digital wallet transaction with the POS device. In so doing, digital wallet data, including transaction data and metadata, is communicated to the POS device. Other digital wallet data, such as biometric data, used to verify the user as the actual user when using the digital wallet application, may also be communicated to the POS device. The POS device then transmits this digital wallet data to the payment processor for processing the transaction. In another example, a user may use a payment card to initiate a transaction with the POS device. The POS device then transmits transaction data including but not limited to, the primary account number (PAN), which includes the bank identification number (BIN) of the user, to the payment processor for processing the transaction. Subsequently, the DC computing device uses such transaction data for performing a lookup in the digital wallet registration data for the PAN to determine whether the user is enrolled in the digital wallet application. If the DC computing device determines the user is enrolled in the digital wallet application, the DC computing device collects the digital wallet data corresponding to the user. The DC computing device also flags the PAN so that future transactions initiated by the user, with the payment card, are automatically linked to the user's digital wallet data.

In alternative embodiments, the DC computing device receives digital wallet data as it is transmitted between the user computing device and the payment processor. In the example embodiment, the digital wallet data contains metadata. For example, the user may purchase a meal at a restaurant in New York City using a digital wallet application. Digital wallet data containing metadata is sent to a payment processor that authorizes the transaction. This metadata may include device ID, browser type, IP address, location data, biometric data, preferred language, etc. In some instances, the metadata may be collected automatically from the user computing device or from an issuing bank associated with the user's account. Once the metadata is received by the payment processor, the metadata is coupled with the other data stored in the DC computing platform, which may include stored digital wallet data.

Digital wallet data is stored in a payment processor database associated with the payment processor. In addition, other demographic data (country of origin, age group, etc.) associated with the user and biometric data may also be stored within the same database. Thus, the payment processor database may include data that may be used to verify that a user made a purchase at a particular location and/or visited that location, and may provide certain demographic data associated with the user.

The DC computing device is configured to receive digital wallet data for a digital wallet transaction conducted using a payment card account associated with a user. The digital wallet data may include metadata that contains the demographic data of the user and the location where the user made the purchase. The digital wallet data may further include the merchant location and type of good or service purchased by the user. For example, the DC computing device may receive digital wallet data that includes metadata providing the user computing device location. The DC computing device may determine this location by either receiving GPS (geolocation) coordinates from the user computing device or by performing a lookup using a merchant identifier received with the digital wallet data. The user computing device geolocation may suggest the merchant location. However, in some instances, users may purchase goods or services on a website, without the need to be present at the merchant location. To accurately determine the merchant location, the DC computing device may use transaction data to determine the merchant registered address and/or place of business. The DC computing device may also determine the merchant location when the DC computing device receives digital wallet data from a POS device. In this case, the DC computing device may receive the POS device IP address, which may allow the DC computing device to determine the POS device location, and thus, the merchant location. The DC computing device may also receive demographic data that includes age, gender, and/or a place of origin (e.g., user's home address and/or preferred language).

In at least some implementations, the DC computing device is configured to compare the digital wallet data to the registration data. This comparison may be done to identify the registered user associated with the received digital wallet data. In doing so, the DC computing device may compare the user's biometric data included in the digital wallet data to the user's identifier stored as part of the registration data. The DC computing device may also compare the device registration data to the device communication data to determine that the user computing device used to send the digital wallet data belongs to a registered user. To perform the comparison, the DC computing device may retrieve a user's registration data from the payment processor database to associate this data with the user's digital wallet data. Once the registration data is retrieved, the DC computing device compares the registration data to the digital wallet data.

Subsequently, the DC computing device links the digital wallet data corresponding to the user with the registration data. More specifically, the transaction data in the digital wallet data is linked to the demographic data in the registration data. For example, the transaction data providing the merchant location, time of purchase, and type of good or service purchased is coupled with the registration data which includes the age and origin of the user. By linking the digital wallet data to the registration data, the DC computing device may determine the type of demographic population that has frequented a merchant location for a particular period of time.

In some embodiments, the DC computing device may be used to generate merchant recommendations based on certain demographics (age, country of origin, etc.) of actual visitors to attractions, venues, and/or merchants in such locations. Accordingly, when a requester requests an attraction or restaurant to visit in a new area, the DC computing platform is able to (i) make a recommendation to the requester that includes a breakdown of the types of people that have actually visited the attraction or restaurant and the requester is able to determine which site to visit, or (ii) make a recommendation to the requester that matches the demographics of the requester to the demographics of prior visitors to the site.

For example, a requester from the United States in the age group 30-35 may be traveling to Edinburgh, Scotland. When the requester requests a merchant recommendation request, the DC computing device communicates with the payment processor database to retrieve the enhanced data based on the requester's geographical origin and age, and generates one or more merchant recommendations based on the retrieved data. For example, the retrieved data may indicate that the most highly visited location in Edinburgh, Scotland by American users in the age group of 30-35 is the Edinburgh Castle.

The DC computing device transmits the results (e.g., the one or more recommended merchants) to a requester computing device. The merchant recommendation may be provided to the requester by SMS text, displayed on a web page, or displayed within an application.

The DC computing device is configured to receive a merchant recommendation request from a requester that may include the demographic data of the requester and a location the requester may want to visit. The demographic data may include specific age, age range (30-35), gender, place of origin (e.g., user's home address and/or preferred language), or the like. The location may include, but is not limited to, locations input by the requester or candidate locations. In one example, the DC computing device may receive a merchant recommendation request that includes at least one location input by the requester, such as geographic locations or domain locations (e.g., virtual locations). The geographic locations may include a geographic area, such as a neighborhood, county, city, state, country, or the like. A domain location may correspond to a specific website (e.g., a pharmacy chain). Two or more domain locations may be associated with a domain category (e.g., merchants selling vitamin products). In another example, the DC computing device may receive a merchant recommendation request that includes at least one candidate location (e.g., locations near by the requester computer device). The at least one candidate location may be based on the GPS (geolocation) coordinates of the requester computing device and/or the GeoIP address of said computing device. In other words, the DC computing device is configured to provide to a requester demographic data of users who visited a particular merchant location and made purchases, and of users visiting a merchant's website who made purchases.

In at least some implementations, the DC computing device is configured to retrieve, from the payment processor database, data associated with a user. This data includes the user demographic information and locations the user might have visited. For example, the DC computing device may retrieve information that provides the user's age, gender, and/or place of origin. The DC computing device may also retrieve a merchant location in order to identify the location a user has visited. The DC computing device may determine the merchant location by looking up at the IP address where the digital wallet data was sent, the merchant's IP address or domain, or at the merchant's registered address and/or place of business.

In some embodiments, the DC computing device is configured to compare the merchant recommendation request data to the data associated with the user. The DC computing device retrieves the merchant recommendation request data and matches it to the user data stored in the payment processor database. For example, the DC computing device may match the destination on the merchant recommendation request to one or more merchant locations stored in the payment processor database. Once the location match is done, the DC computing device may compare the age of the requester to the ages of users, stored in the payment processor database, who have made purchases at locations matching the destination on the merchant recommendation request.

Alternatively, the DC computing device may match the age of a requester to the age of users stored in the payment processor database. Subsequently, the DC computing device may compare the destination on the merchant recommendation request to locations, stored in the payment processor database, that were visited by users matching the age of the requester.

In other embodiments, the DC computing device may match the place of origin of a requester to the place of origin of users stored in payment processor database. Subsequently, the DC computing device may compare the destination of the merchant recommendation request to locations, stored in the payment processor database, that were visited by users matching the origin of the requester.

In yet other embodiments, the DC computing device may match the gender of a requester to the gender of users stored in the payment processor database. Subsequently, the DC computing device may compare the destination of the merchant recommendation request to locations, stored in the payment processor database, that were visited by users matching the gender of the requester.

In the absence of matching data between the merchant recommendation request and the payment processor database, the DC computing device may access the issuing bank database to obtain users' data corresponding to their demographics and locations where they have made purchases.

In at least some embodiments, once the matching process is complete, the DC computing device is configured to generate a merchant recommendation based on the matching data identified during the matching process. The DC computing device may provide merchant recommendations that are specific (e.g., a restaurant or multiple restaurants) and/or non-specific (e.g., a neighborhood or region). The DC computing device may also provide destination recommendations that target a particular age (e.g., 30) and/or a range (e.g., 30-35).

In yet other embodiments, the DC computing device is configured to transmit the merchant recommendation to the requester by SMS text, displayed on a web page, or displayed within an application. The requester may designate the type of communication channel that the DC computing device may use. Or, the DC computing device may be configured to use a default type of transmission when the requester does not designate one.

The technical problems addressed by DC computing platform include at least one of: (i) inability of generating outputs that include a breakdown by users' demographics, and (ii) inability of generating outputs that may suggest locations that a particular demographic population may want to visit.

The methods and systems described herein may be implemented using computer programming or engineering techniques including computer software, firmware, hardware, or any combination or subset thereof, wherein the technical effects may be achieved by (i) receiving registration data for a user in response to the user registering into a digital wallet application, wherein the registration data includes demographic data of the user and device registration data including a device identifier used for identifying the user device when in communication with another computing device, (ii) storing the registration data within the memory, (iii) receiving digital wallet data as part of a digital wallet transaction initiated by the user using the digital wallet application on the user device, the digital wallet data including transaction data, device communication data, and biometric data, (iv) comparing the digital wallet data to the registration data, (v) linking the digital wallet data within the memory to the registration data including the demographic data of the user, and (vi) determining the demographic data associated with a plurality of users for at least one merchant.

The resulting technical benefits achieved by the DC computing platform include at least one of: (i) new and improved usage of existing user demographic data and purchasing locations received from user and merchant computing devices, (ii) improved merchant recommendations based on demographic data and destination location, and (iii) ability of requesters to obtain a demographics breakdown of prior visitors to a site.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example data collector (DC) platform for collecting digital wallet data from a digital wallet transaction initiated by a user for determining the user's demographics. Embodiments described herein may relate to a transaction card system, such as a payment card payment system using the Mastercard [CH] interchange network. The Mastercard interchange network is a set of proprietary communications standards promulgated by Mastercard International Incorporated for the exchange of financial transaction data and the settlement of funds between financial institutions that are members of Mastercard International Incorporated. (Mastercard is a registered trademark of Mastercard International Incorporated located in Purchase, N.Y.). Embodiments described herein also relate to a data collector (DC) computing device 150 that is communicatively coupled to an interchange network computing device 28. The DC computing device 150 is configured to receive digital wallet data from interchange network computing device 28 and determine a user's demographics based on the digital wallet data received.

In the exemplary DC platform, a financial institution called the "issuer" or "issuing bank" issues an account, such as a credit card account, to the user 22, who uses the account to tender payment for a purchase from a merchant 24. In one embodiment, the user presents a digital wallet to merchant 24 (also known as a card-present transaction) using a user computing device. In another embodiment, the user does not present a digital wallet and instead performs a card-not-present transaction. For example, the card-not-present transaction may be initiated via an digital wallet application, through a website or web portal, via telephone, or any other method that does not require the user to present a physical payment card to merchant 24 (e.g., via scanning the digital wallet).

To accept payment with the transaction card, merchant 24 establishes an account with a financial institution that is part of the financial payment system. This financial institution is usually called the "merchant bank," the "acquiring bank," or the "acquirer." In one embodiment, user 22 tenders payment for a purchase using a transaction card at a transaction processing device 40 (e.g., a point of sale device), then merchant 24 requests authorization from a merchant bank 26 for the amount of the purchase. The request is usually performed through the use of a point-of-sale terminal, which reads user 22's account information from a magnetic stripe, a chip, barcode, or embossed characters on the transaction card (e.g., a digital wallet) and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether user 22's account 32 is in good standing and whether the purchase is covered by user 22's available credit line. Based on these determinations, the request for authorization will be declined or accepted. If the request is accepted, an authorization code is issued to merchant 24.

When a request for authorization is accepted, the available credit line of user 22's account 32 is decreased. Normally, a charge for a payment card transaction is not posted immediately to user 22's account 32 because certain rules do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If user 22 cancels a transaction before it is captured, a "void" is generated. If user 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional digital wallet data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, user account information, a type of transaction, information regarding the purchased item and/or service, and/or other suitable information, is associated with a transaction and transmitted between parties to the transaction as digital wallet data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, user 22, merchant 24, merchant bank 26, interchange network 28 (also referred to herein as payment processor 28), issuer bank 30, and/or an issuer processor 21.

Figure 2:
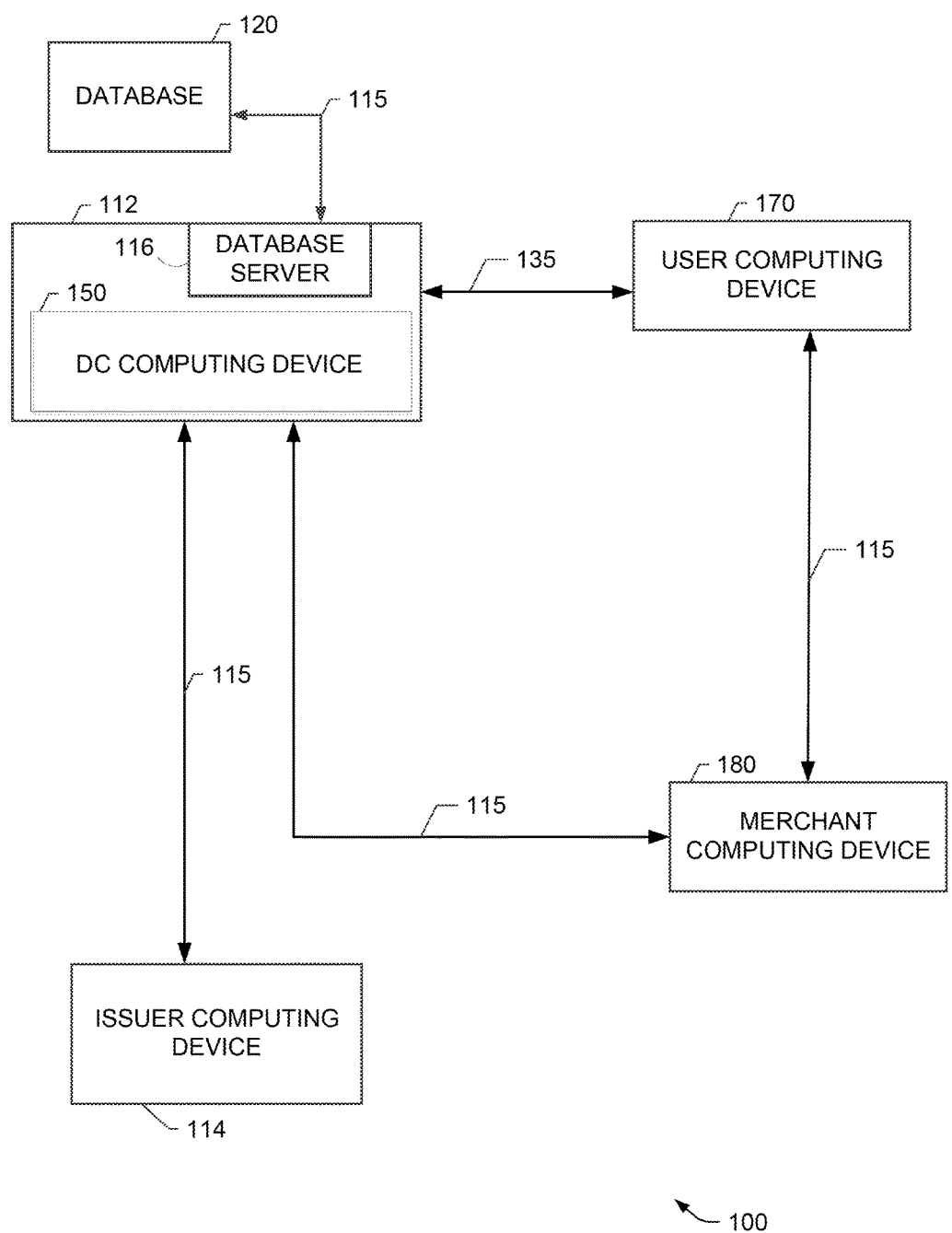

FIG. 2 is a block diagram of an example data collector (DC) computing platform, in which a variety of computing devices are communicatively coupled to each other via a plurality of network connections. These network connections may be Internet, LAN/WAN (Local Area Network/Wide Area Network), or other connections capable of transmitting data across computing devices. Environment 100 shows data collector (DC) computing device 150 and a database server 116. In one embodiment, DC computing device 150 and database server 116 are components of server system 112. Server system 112 may be a server, a network of multiple computer devices, a virtual computing device, or the like. DC computing device 150 is connected to at least one user computing device 170, a merchant computing device 180, and an issuer computing device 114 via at least a network connection 115.

In one embodiment, DC computing device 150 is configured to receive digital wallet data from merchant computing device 180, over a network connection 115. As noted with respect to FIG. 1, when a user performs a transaction at a merchant location, digital wallet data is generated. Digital wallet data may be transmitted across computer devices as a digital wallet data message. In one embodiment, when a user performs a transaction at merchant computing device 180 associated with a merchant, digital wallet data for the transaction is transmitted to server system 112. Server system 112 processes the digital wallet data in the manner described with respect to FIG. 1 and also provides it to DC computing device 150. DC computing device 150 is also configured to communicate with user computing device 170 via an electronic communication channel or method that is distinct from one used to communicate digital wallet data. In the example embodiment, DC computing device 150 is configured to communicate with user computing device 170 via electronic communication channel 135.

The digital wallet data message may also include a transaction amount, a transaction date, account data related to the payment card used to perform the transaction (e.g., primary account number associated with payment card, card expiration date, card issuer, card security code, or the like), a merchant identifier, stock-keeping unit (SKU) data relating to the goods or services purchased from the user, or the like. In one embodiment, the digital wallet data message also includes location data. As used herein, address data, city data, state data, zip or postal code data, country data, merchant location identifier data, IP address data, MAC address data, or the like. In another embodiment, the digital wallet data message further includes demographic data. This demographic data may correspond to the user's age, place of origin, gender, and the like. The DC computing device 150 is configured to receive registration data, store such registration data within the memory, further receive digital wallet data as part of a digital wallet transaction initiated by a user, then compare the registration data to the digital wallet data, link the digital wallet data to the registration data, and determine demographic data associated with multiple users for one or more merchants. In one embodiment, DC computing device 150 parses the complete digital wallet data file searching for, filtering, or otherwise extracting demographic data. For example, DC computing device 150 may determine after parsing the complete digital wallet data file that it contains an age identifier.

Database server 116 is connected to database 120, which contains information on a variety of matters, as described below in greater detail. In one embodiment, database 120 is stored on server system 112 and can be accessed by potential users of server system 112. In an alternative embodiment, database 120 is stored remotely from server system 112 and may be non-centralized. Database 120 may include a single database having separated sections or partitions or may include multiple databases, each being separate from each other. Database 120 may store demographic data for each user in communication with DC computing device 150.

In the example embodiment, DC computing device 150 includes specifically designed computer hardware to perform the steps described herein, and includes specifically designed computer implementation instructions. DC computing device 150 is a specially designed and customized computer device built to perform the specific function of collecting digital wallet data from a digital wallet transaction initiated by a user for determining the user's demographics (e.g., age or place of origin) and generating merchant recommendations based on demographic data and location data (e.g., most visited restaurants in Sydney by 30 year-old Americans).

Figure 3:
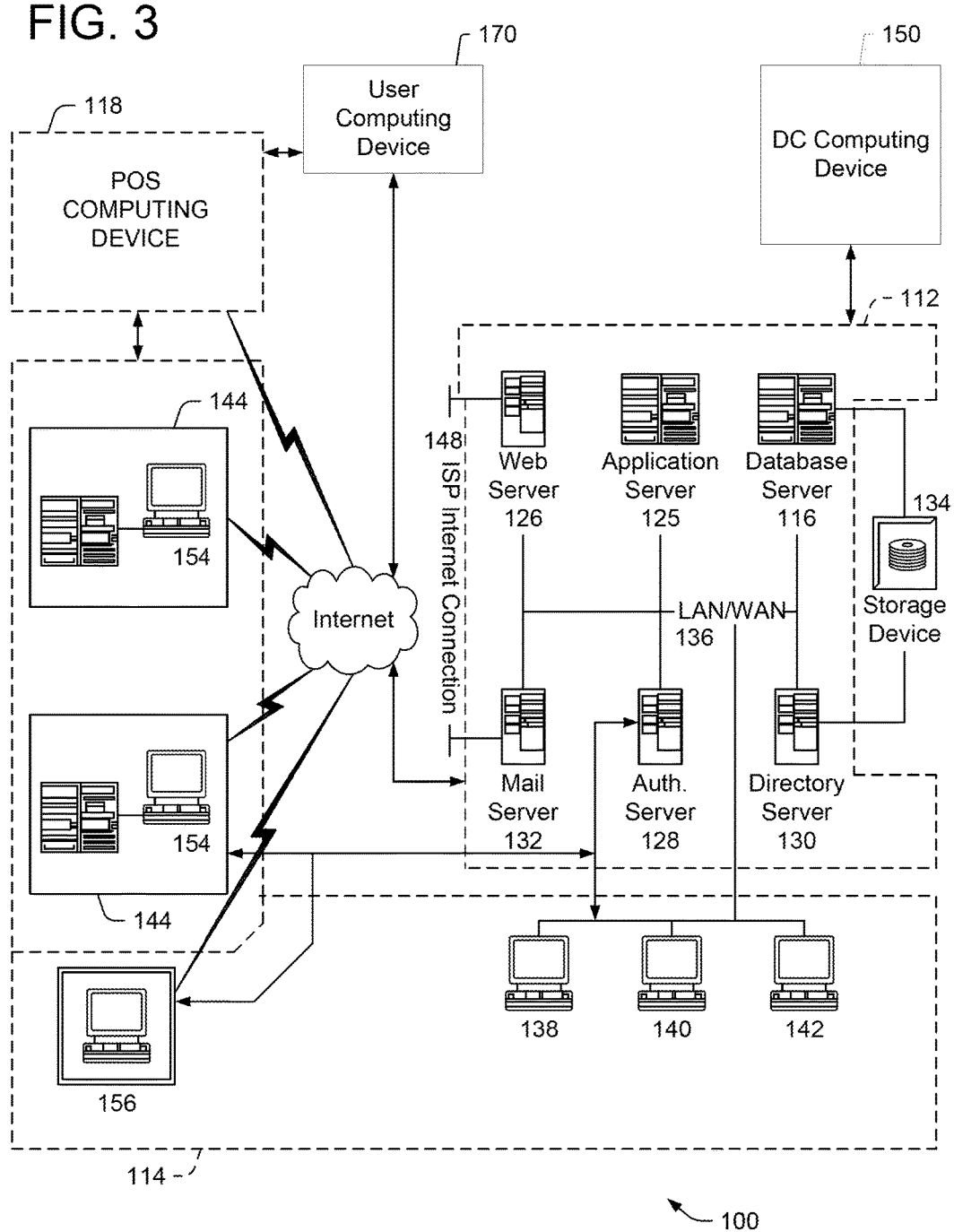

FIG. 3 is an expanded block diagram of an example embodiment of server architecture of a data collector (DC) computer platform including other computer devices in accordance with one embodiment of the present disclosure. Components in DC computer platform 100, identical to components of environment 100 (shown in FIG. 2), are identified in FIG. 3 using the same reference numerals as used in FIG. 2. DC computer platform 100 includes server system 112 (similar to DC computing device 150, shown in FIG. 2). Server system 112 further includes database server 116, an application server 125, a web server 126, an authentication server 128, a directory server 130, and a mail server 132. A storage device 134 is coupled to database server 116 and directory server 130. Servers 116, 125, 126, 128, 130, and 132 are coupled in a network connection, such as LAN/WAN 136. In addition, an issuer bank workstation 138 (similar to issuer computing device 114 shown in FIG. 2), acquirer bank workstation 140, and a third party processor workstation 142 may be coupled to LAN/WAN 136.

In the example embodiment, issuer bank workstation 138, acquirer bank workstation 140, and third party processor workstation 142 are coupled to LAN/WAN 136 using network connection 115 (shown in FIG. 2). Workstations 138, 140, and 142 are coupled to LAN/WAN 136 using an Internet link or are connected through an Intranet. In the example embodiment, DC computing device 150 is in communication with issuer bank workstation 138 and POS computing device 118 (which may be, for example, the same as merchant computing device 180 (as shown in FIG. 2)). The user computer device 170 is connected to the Internet and may be a smartphone, personal computer, tablet computer, desktop, laptop, or similar computing device. DC computing device 150 is configured to receive digital wallet data, including transaction data, metadata, and biometric data, from POS computing device 118 and user computing device 170 via server system 112.

Each workstation 138, 140, and 142 is a computer with Internet access. Although the functions performed at the workstations typically are illustrated as being performed at respective workstations 138, 140, and 142, such functions can be performed at one of many personal computers coupled to LAN/WAN 136. Workstations 138, 140, and 142 are illustrated as being associated with separate functions only to facilitate an understanding of the different types of functions that can be performed by individuals having access to LAN/WAN 136.

Server system 112 is configured to be communicatively coupled to various individuals, including employees and third parties 144 (e.g., auditors, developers, merchants, acquirers, issuers, etc.), using an ISP Internet connection 148. The communication in the example embodiment is illustrated as being performed using the Internet. However, any other wide area network (WAN) type communication can be utilized in other embodiments. In other words, the systems and processes are not limited to being practiced using the Internet.

In the example embodiment, any authorized individual having a workstation 154 can access DC computer platform 100. At least one of the client systems includes a manager workstation 156 located at a remote location. Workstations 154 and 156 are personal computers having a web browser. Also, workstations 154 and 156 are configured to communicate with server system 112. Furthermore, authentication server 128 communicates with remotely located client systems, including a client system 156 using a telephone link. Authentication server 128 is configured to communicate with other client workstations 138, 140, and 142 as well.

Figure 4:
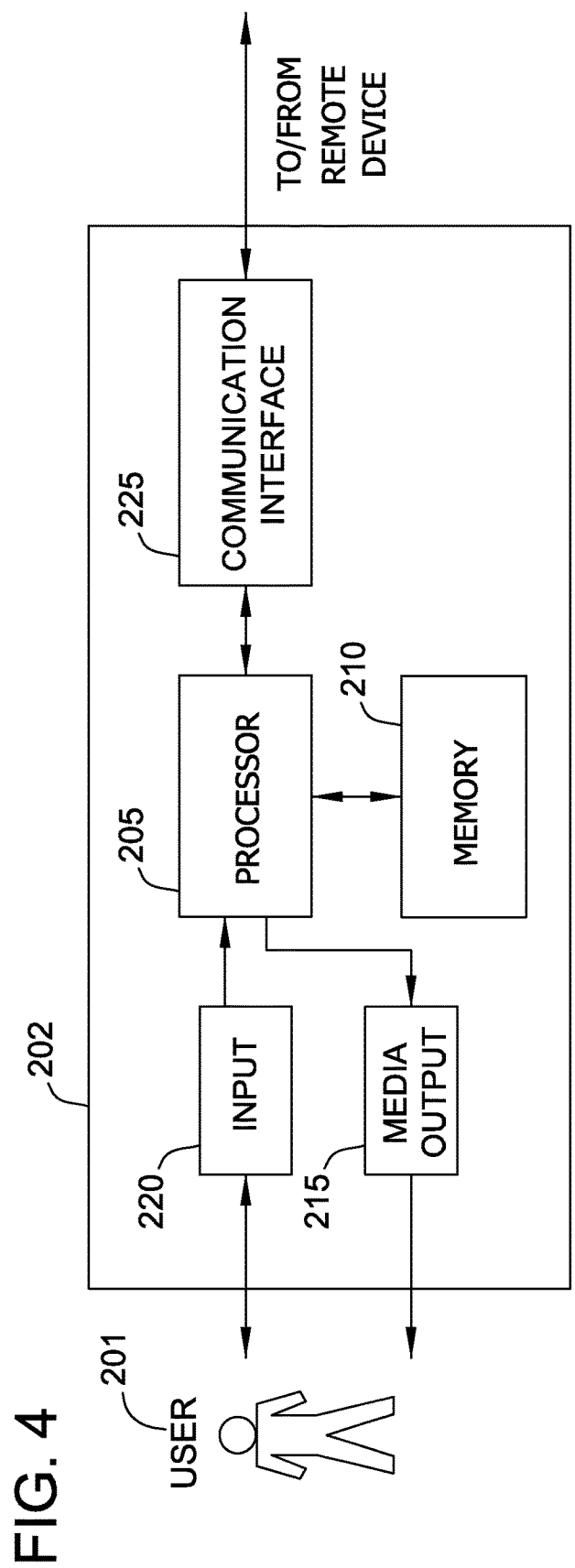

FIG. 4 illustrates an example configuration of a user system, such as a user computing device configured to transmit data to the DC computing device. User system 202 may include, but is not limited to, user computing device 170 (shown in FIG. 2). In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. For example, media output component 215 may be a display component configured to display component lifecycle data in the form of reports, dashboards, communications, or the like. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as server system 112 (shown in FIG. 2). Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a web site from server system 112. A client application allows user 201 to interact with a server application from server system 112.

Figure 5:
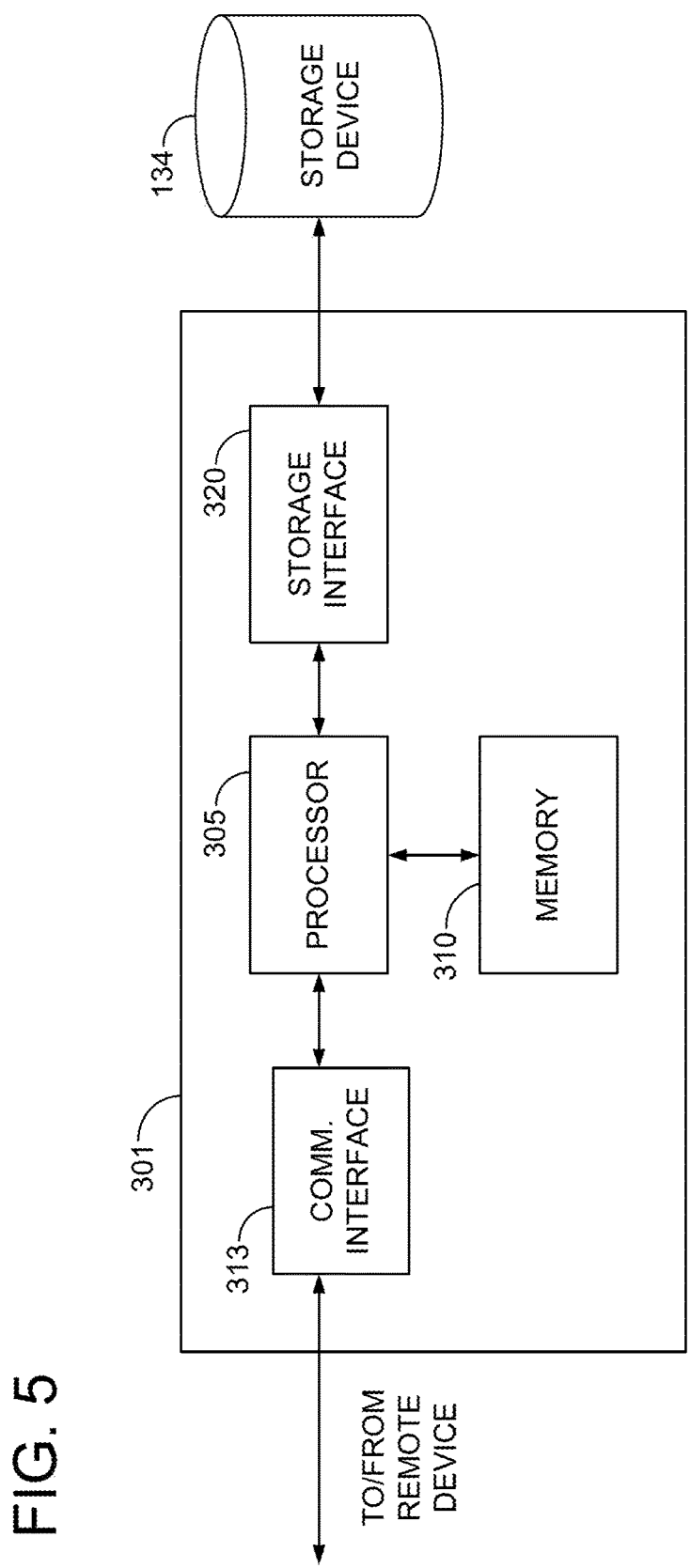

FIG. 5 illustrates an example configuration of a server system 301 such as the server system 112 shown in FIG. 2 that includes DC computing device 150 (shown in FIG. 2). Server system 301 may include, but is not limited to, database server 116 (shown in FIG. 2) or DC computing device 150 (shown in FIG. 2). In some embodiments, server system 301 is similar to server system 112 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 313 such that server system 301 is capable of communicating with a remote device such as a user system or another server system 301. For example, communication interface 313 may receive communications from issuer computing devices 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6A:
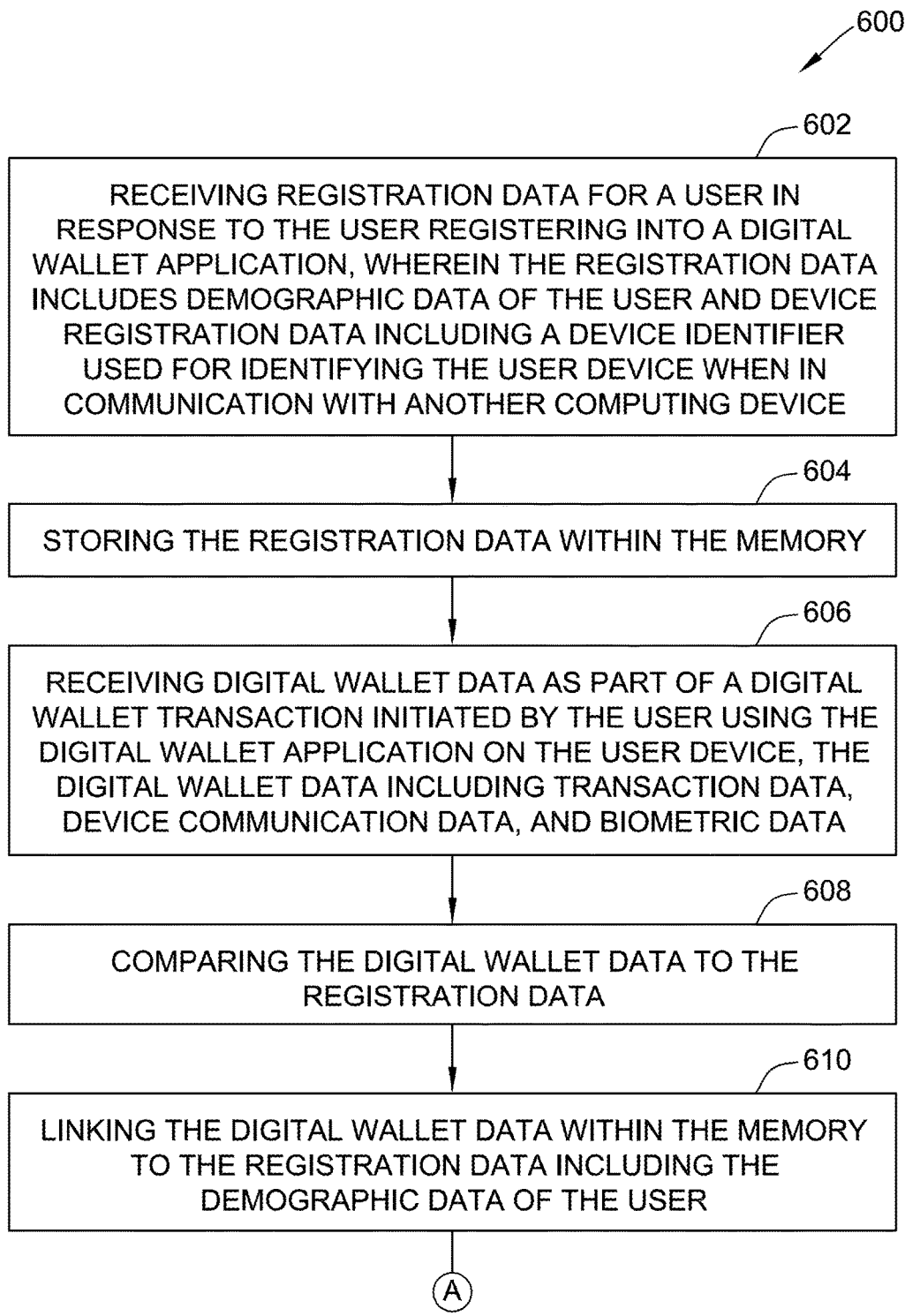
FIGS. 6A and 6B show an example method flow illustrating how the DC computing device collects device communication, transaction and biometric data.
Figure 6B:
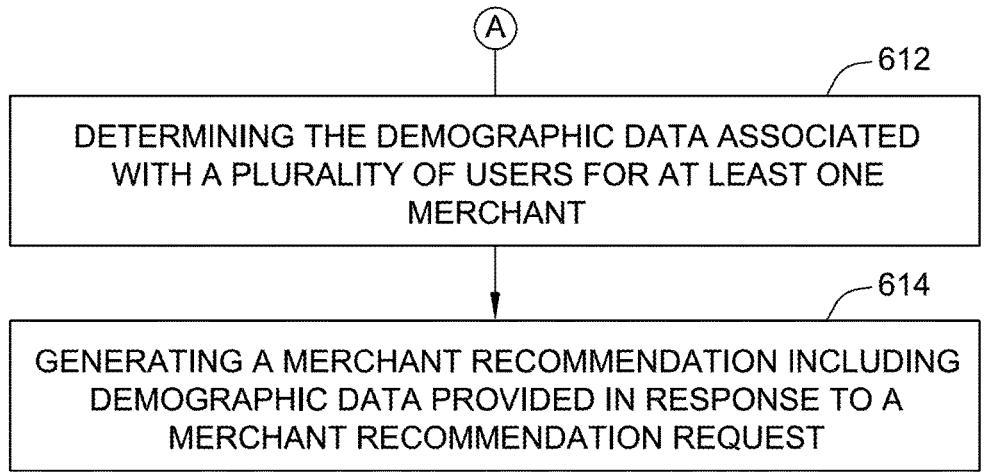

FIGS. 6A and 6B are an example flow diagram illustrating a method flow by which DC computing device 150 (shown in FIG. 2) collects digital wallet data from a digital wallet transaction initiated by a user for determining the user's demographics. In the example embodiment, DC computing device 150 receives 602 registration data, from a user computing device, including the user demographic data. DC computer device 150 stores 604 the registration within a memory (e.g., a payment processor database). DC computer device 150 further receives 606 digital wallet data from a user using a digital wallet application to perform a digital wallet transaction. Subsequently, DC computing 150 device compares 608 the digital wallet data to the registration data, links 610 the digital data to the registration data including the demographic data of the user, and determines 612 the demographic data associated with multiple users for one or more merchants.

At the time of registration or enrollment for the digital wallet application, user computing device 170 (shown in FIG. 2) creates device registration data. During the registration process, DC computing device 150 receives 602 registration data, which may include user account data, device data associated with user computing device 170, and demographic data of the user. For example, during the registration process, users may be asked for demographic data, such as their age and preferred language. Preferred language can aid in the determination of a country of origin of the user because many countries have a national language.

Subsequently, DC computing device 150 may store 604 the demographic data of the user in a storage device 134 (shown in FIG.3) as part of the registration data. The device registration data may include some of this demographic and/or other device data that may be shared when the digital wallet is used to perform a transaction. For example, device registration data may include device ID, browser type, IP address, user location data, biometric data, preferred language, etc.

DC computing device 150 receives digital wallet as part of a digital wallet transaction initiated by user computing device 170 at point of sale (POS) computing device 118 (shown in FIG. 3) associated with a merchant. POS computing device 118 may transmit digital wallet data to processor 305 via network connection 115 (shown in FIG. 2). The digital wallet data may include transaction data, the device communication data or metadata, and biometric data associated with the transaction and the user.

The DC computing device 150 compares 608 the digital wallet data received from POS device 118 to the registration data stored in storage device 134. This comparison may be performed to identify the registered user associated with the received digital wallet data. In doing so, DC computing device 150 may compare the user's biometric data included in the digital wallet data to the user's identifier stored, in storage device 134, as part of the registration data. DC computing device 150 may also compare the device registration data to the device communication data to determine that user computing device 170 used to send the digital wallet data belongs to a registered user. To perform the comparison, DC computing device 150 may retrieve a user's registration data from storage device 134 to associate this data with the user's digital wallet data. Once the registration data is retrieved, DC computing device 150 compares 608 the registration data to the digital wallet data.

Subsequently, DC computing device 150 links 610 the digital wallet data corresponding to the user with the registration data. More specifically, the transaction data in the digital wallet data is linked to the demographic data in the registration data. For example, the transaction data providing the merchant location, time of purchase, and type of good or service purchased is coupled with the registration data which includes the age and origin of the user.

By linking the digital wallet data to the registration data, the DC computing device 150 may determine 612 the demographic data associated with a plurality of users for at least one merchant. For example, DC computing device 150 may use the determined demographic data to identify the type of demographic population that has frequented a merchant location for a particular period of time. DC computing device 150 may also use the determined demographic data to generate 614 merchant recommendations based on certain demographics (age, country of origin, etc.) of actual visitors to attractions, venues, and/or merchants in such locations.

In some embodiments, DC computing device 150 receives a merchant recommendation request from a requester. When the requester requests a merchant recommendation request, DC computing device 150 communicates with storage device 134 to retrieve the enhanced data based on the requester's geographical origin and age, and generates 614 one or more merchant recommendations based on the retrieved data. DC computing device 150 transmits the results (e.g., the one or more recommended merchants) to a requester computing device. The merchant recommendation may be provided to the requester by SMS text, displayed on a web page, or displayed within an application.

Figure 7:
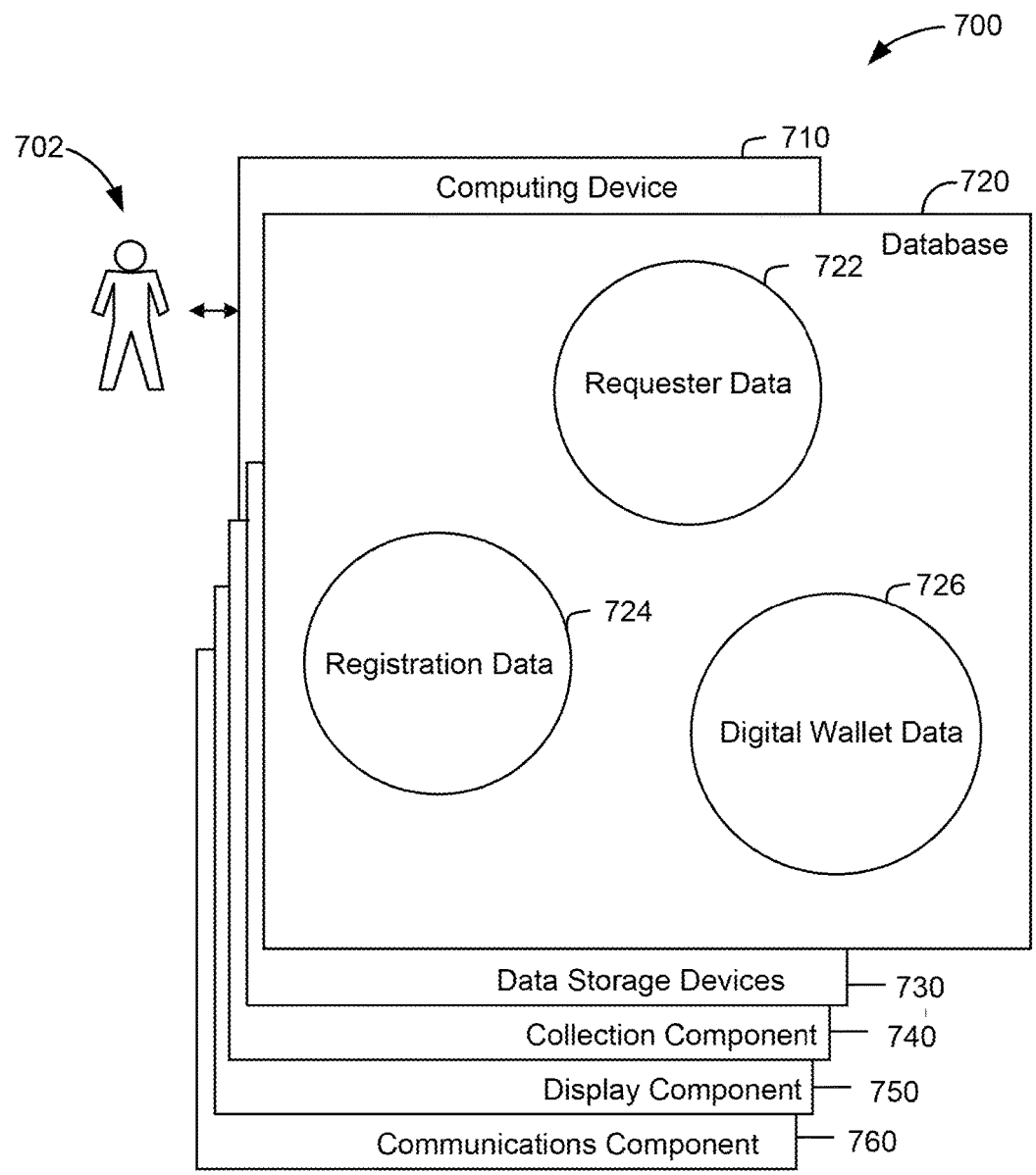

FIG. 7 shows an example configuration of a database 700 within a computing device, along with other related computing components, that may be used to collect digital wallet data from a digital wallet transaction initiated by a user for determining the user's demographics. In some embodiments, computing device 710 is similar to server system 112 (shown in FIG. 2). User 702 (such as a user operating server system 112) may access computing device 710 in order to verify a user's demographic. In some embodiments, database 720 is similar to database 120 (shown in FIG. 2). In the example embodiment, database 720 includes requester data 722, registration data 724, and digital wallet data 726. Requester data 722 may include requester personal data (e.g., address, city, state, zip or postal code, country, preferred language, demographic data), requester computing device data (e.g., IP address data, MAC address data), and requester input location (e.g., city, state, zip or postal code, country).

Registration data 724 may include user personal data (e.g., address, city, state, zip or postal code, country, telephone number, preferred language, account numbers, demographic data), issuer data, or the like. Digital wallet data 726 may include transaction amounts, transaction dates/times, account data related to the payment card used to perform the transaction (e.g., primary account number associated with payment card, card expiration date, card issuer, card security code, or the like), merchant identifiers, stock-keeping unit (SKU) data relating to the goods or services purchased from the user, the user demographic data or the like.

Computing device 710 also includes data storage devices 730. Computing device 710 also includes collection component 740 that determines the demographic data associated with multiple users for one or more merchants. Collection component 740 may perform, for example, the comparing 608, linking 610, and/or determining 612 steps described in FIGS. 6A and 6B. Computing device 710 also includes display component 750 that facilitates displaying data. Computing device 710 also includes communications component 760 which is used to communicate with user computing devices, issuer computing devices, and merchant computing devices, using predefined network protocols such as TCP/IP (Transmission Control Protocol/Internet Protocol) over the Internet.

As will be appreciated based on the foregoing specification, the above-described embodiments of the disclosure may be implemented using computer programming or engineering techniques including computer software, firmware, hardware or any combination or subset thereof, wherein the technical effect is to collect digital wallet data from a digital wallet transaction initiated by a user for determining the user's demographics. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for collecting digital wallet data from a digital wallet transaction initiated by a user for determining the user's demographics and generating merchant recommendations for the user, said method performed using a data collector (DC) computing device comprising at least one processor in communication with at least one memory device, said method comprising:

receiving, from a plurality of users using a digital wallet application on a respective user device, registration data for each of the plurality of users in response to a user registering into the digital wallet application, wherein the registration data includes demographic data inputted by the user, a biometric of the user which constitutes a physical characteristic that self-authenticates the user using the respective user device during a transaction, and device data including a device identifier used for identifying the respective user device of the user;

storing the registration data of each user within the at least one memory device;

for each of a plurality of transactions by the plurality of users:

receiving digital wallet data related to a single digital wallet transaction that is initiated by the user using the digital wallet application on the user's respective user device, the digital wallet data including transaction data, the device data, and the biometric of the user captured by the respective user device, wherein the transaction data includes an account number, a transaction amount, and at least one merchant and a respective merchant physical location for the at least one merchant, and wherein a payment processor processes the transaction data for payment;

comparing the biometric of the user captured by the respective user device in the single digital wallet transaction to the registration data of the user in order to match the biometric data of the respective user;

linking the digital wallet data of the single digital wallet transaction with the registration data of the respective user;

wherein the linking enhances the digital wallet data by determining a demographic population associated with each user, from the plurality of registered users, that has frequented a merchant location for a particular period of time;

receiving, via a communications component of the DC computing device, a communication submitted from within the digital wallet application of the user's respective user device using a predefined network protocol, the communication including a merchant recommendation request, the merchant recommendation request including a received location which is a current location of the user determined by a geolocation component of the respective user device as well as demographic data of the user;

determining one or more other users, from the plurality of users with the transaction data that includes the respective merchant physical location within a distance range from the received location in the user's request;

retrieving the demographic data of the user from the registration data of the user;

retrieving the demographic data of the one or more other users from the enhanced digital wallet data of the one or more other users;

comparing the demographic data of the user to the demographic data of the one or more other users;

matching, based on the comparison, the demographic data of the user to the demographic data of the one or more other users;

extracting one or more merchants from the transaction data of the one or more other users for which the demographic data matches the demographic data of the user, each of the one or more merchants having the respective merchant physical location within the distance range from the received location in the user's request;

generating a merchant recommendation for the user, wherein the merchant recommendation includes the one or more merchants and the respective merchant physical location; and transmitting the merchant recommendation to the user via the respective user device.

2. The method of claim 1, wherein the digital wallet data includes at least one item identifier identifying a product or service purchased by the user.

3. The method of claim 1,
wherein the demographic data is stored in association with at least one merchant identifier identifying the at least one merchant such that a merchant identifier for a particular merchant is associated with demographic data for users conducting digital wallet transactions at that particular merchant.

4. The method of claim 1, wherein identifying at least one recommended merchant comprises identifying at least one recommended merchant located within a predetermined parameter of the location, and wherein generating the merchant recommendation further comprises generating the merchant recommendation including at least one demographic data associated with the at least one recommended merchant and a location corresponding the at least one merchant.

5. A data collector (DC) computing device comprising at least one processor in communication with at least one memory device, said DC computing device configured to:

receive, by the at least one processor from a plurality of users using a digital wallet application on a respective user device, registration data for each of the plurality of users in response to a user registering into the digital wallet application, wherein the registration data includes demographic data inputted by the user, a biometric of the user which constitutes a physical characteristic that self-authenticates the user using the respective user device during a transaction, and device data including a device identifier used for identifying the respective user device of the user;

store, by the at least one processor, the registration data of each user within the at least one memory device;

for each of a plurality of transactions by the plurality of users:

receive, by the at least one processor, digital wallet data related to a single digital wallet transaction that is initiated by the user using the digital wallet application on the user's respective user device, the digital wallet data including transaction data, the device data, and the biometric of the user captured by the respective user device, wherein the transaction data includes an account number, a transaction amount, and at least one merchant and a respective merchant physical location for the at least one merchant, and wherein a payment processor processes the transaction data for payment;

compare, by the at least one processor, the biometric of the user captured by the respective user device in the single digital wallet transaction to the registration data of the user in order to match the biometric data of the respective user;

link, by the at least one processor, the digital wallet data of the single digital wallet transaction with the registration data of the respective user;

wherein the linking enhances the digital wallet data by determining a demographic population associated with each user, from the plurality of registered users, that has frequented a merchant location for a particular period of time;

receive, by the at least one processor via a communications component of the DC computing device, a communication submitted from within the digital wallet application of the user's respective user device using a predefined network protocol, the communication including a merchant recommendation request, the merchant recommendation request including a received location which is a current location of the user determined by a geolocation component of the respective user device as well as demographic data of the user;

determine, by the at least one processor, one or more other users, from the plurality of users, with the transaction data that includes the respective merchant physical location within a distance range from the received location in the user's request;

retrieve, by the at least one processor, the demographic data of the user from the registration data of the user;

retrieve, by the at least one processor, the demographic data of the one or more other users from the enhanced digital wallet data of the one or more other users;

compare, by the at least one processor, the demographic data of the user to the demographic data of the one or more other users;

match, by the at least one processor based on the comparison, the demographic data of the user to the demographic data of the one or more other users;

extract, by the at least one processor, one or more merchants from the transaction data of the one or more other users for which the demographic data matches the demographic data of the user, each of the one or more merchants having the respective merchant physical location within the distance range from the received location in the user's request;

generate, by the at least one processor, a merchant recommendation for the user, wherein the merchant recommendation includes the one or more merchants and the respective merchant physical location; and transmit, by the at least one processor, the merchant recommendation to the user via the respective user device.

6. The DC computing device of claim 5, wherein the digital wallet data includes at least one item identifier identifying a product or service purchased by the user.

7. The DC computing device of claim 5,
wherein the demographic data is stored in association with at least one merchant identifier identifying the at least one merchant such that a merchant identifier for a particular merchant is associated with demographic data for users conducting digital wallet transactions at that particular merchant.

8. The DC computing device of claim 5, wherein to generate the merchant recommendation, the DC computing device is further configured to generate the merchant recommendation including at least one demographic data associated with the at least one recommended merchant.

9. A non-transitory computer readable medium that includes computer executable instructions for collecting digital wallet data from a digital wallet transaction initiated by a user for determining the user's demographics and generating merchant recommendation for the user, wherein when executed by a data collector (DC) computing device comprising at least one processor in communication with at least one memory device, the computer executable instructions cause the DC computing device to:

receive, by the at least one processor from a plurality of users using a digital wallet application on a respective user device, registration data for each of the plurality of users in response to a user registering into the digital wallet application, wherein the registration data includes demographic data inputted by the user, a biometric of the user which constitutes a physical characteristic that self-authenticates the user using the respective user device during a transaction, and device data including a device identifier used for identifying the respective user device of the user when in communication with another computing device;

store, by the at least one processor, the registration data of each user within the at least one memory device;

for each of a plurality of transactions by the plurality of users:

receive, by the at least one processor, digital wallet data related to a single digital wallet transaction that is initiated by the user using the digital wallet application on the user's respective user device, the digital wallet data including transaction data, the device data, and the biometric of the user captured by the respective user device, wherein the transaction data includes an account number, a transaction amount, and at least one merchant and a respective merchant physical location for the at least one merchant, and wherein a payment processor processes the transaction data for payment;

compare, by the at least one processor, the biometric of the user captured by the respective user device in the single digital wallet transaction to the registration data of the user in order to match the biometric data of the respective user;

link, by the at least one processor, the digital wallet data of the single digital wallet transaction with the registration data of the respective user;

wherein the linking enhances the digital wallet data by determining a demographic population associated with each user, from the plurality of registered users, that has frequented a merchant location for a particular period of time;

receive, via a communications component of the DC computing device, a communication submitted from within the digital wallet application of the user's respective user device using a predefined network protocol, the communication including a merchant recommendation request, the merchant recommendation request including a received location which is a current location of the user determined by a geolocation component of the respective user device as well as demographic data of the user;

determine, by the at least one processor, one or more other users, from the plurality of users, with the transaction data that includes the respective merchant physical location within a distance range from a received location in the user's request;

retrieve, by the at least one processor, the demographic data of the user from the registration data of the user;

retrieve, by the at least one processor, the demographic data of the one or more other users from the enhanced digital wallet data of the one or more other users;

compare, by the at least one processor, the demographic data of the first user to the demographic data of the one or more other users;

match, by the at least one processor based on the comparison, the demographic data of the user to the demographic data of the one or more other users;

extract, by the at least one processor, one or more merchants from the transaction data of the one or more other users for which the demographic data matches the demographic data of the user, each of the one or more merchants having the respective merchant physical location within the distance range from the received location in the user's request;

generate, by the at least one processor, a merchant recommendation for the user, wherein the merchant recommendation includes the one or more merchants and the respective merchant physical location; and transmit, by the at least one processor, the merchant recommendation to the user via the respective user device.

10. The non-transitory computer readable medium of claim 9, wherein the digital wallet data includes at least one item identifier identifying a product or service purchased by the user.

11. The non-transitory computer readable medium of claim 9, wherein the demographic data is stored in association with at least one merchant identifier identifying the at least one merchant such that a merchant identifier for a particular merchant is associated with demographic data for users conducting digital wallet transactions at that particular merchant.

* * * * *